United States Patent
Kallugudde

(10) Patent No.: US 11,570,168 B2
(45) Date of Patent: Jan. 31, 2023

(54) TECHNIQUES FOR REPEAT AUTHENTICATION

(71) Applicant: Mastercard International Incorporated, Purchase, NY (US)

(72) Inventor: Manu Dharmaiah Kallugudde, London (GB)

(73) Assignee: Mastercard International Incorporated, Purchase, NY (US)

( * ) Notice: Subject to any disclaimer, the term of this patent is extended or adjusted under 35 U.S.C. 154(b) by 158 days.

(21) Appl. No.: 16/999,798

(22) Filed: Aug. 21, 2020

(65) Prior Publication Data

US 2021/0084029 A1 Mar. 18, 2021

(30) Foreign Application Priority Data

Sep. 17, 2019 (EP) .................................... 19197832

(51) Int. Cl.
*H04L 29/06* (2006.01)
*H04L 9/40* (2022.01)
*G06F 21/31* (2013.01)

(52) U.S. Cl.
CPC .......... *H04L 63/0838* (2013.01); *G06F 21/31* (2013.01)

(58) Field of Classification Search
CPC .............................. G06F 21/31; H04L 63/0838
See application file for complete search history.

(56) References Cited

U.S. PATENT DOCUMENTS

| | | | |
|---|---|---|---|
| 11,228,592 B1* | 1/2022 | Peterson | H04L 63/0876 |
| 2008/0222711 A1* | 9/2008 | Michaelis | H04W 12/50 726/7 |
| 2014/0161258 A1* | 6/2014 | Yang | H04W 12/03 380/270 |
| 2015/0365384 A1* | 12/2015 | Rider Jimenez | G06Q 10/00 380/252 |
| 2018/0211249 A1* | 7/2018 | Sims | G06Q 20/00 |
| 2020/0294045 A1* | 9/2020 | Howard | G06Q 30/0617 |

* cited by examiner

*Primary Examiner* — Tongoc Tran
(74) *Attorney, Agent, or Firm* — Hovey Williams LLP

(57) ABSTRACT

The invention provides an authentication technique that involves provision of a new authentication credential for each authentication attempt. The requestor of the new authentication credential is required to provide a previous authentication credential in order to successfully receive the new authentication credential. The previous authentication credential has however been de-authorised so it cannot be used to authenticate the requestor, only to successfully obtain a new authentication credential. The requestor then authenticates using the new authentication credential. The cycle is repeated for as many repeat authentication attempts as are made by the requestor.

20 Claims, 8 Drawing Sheets

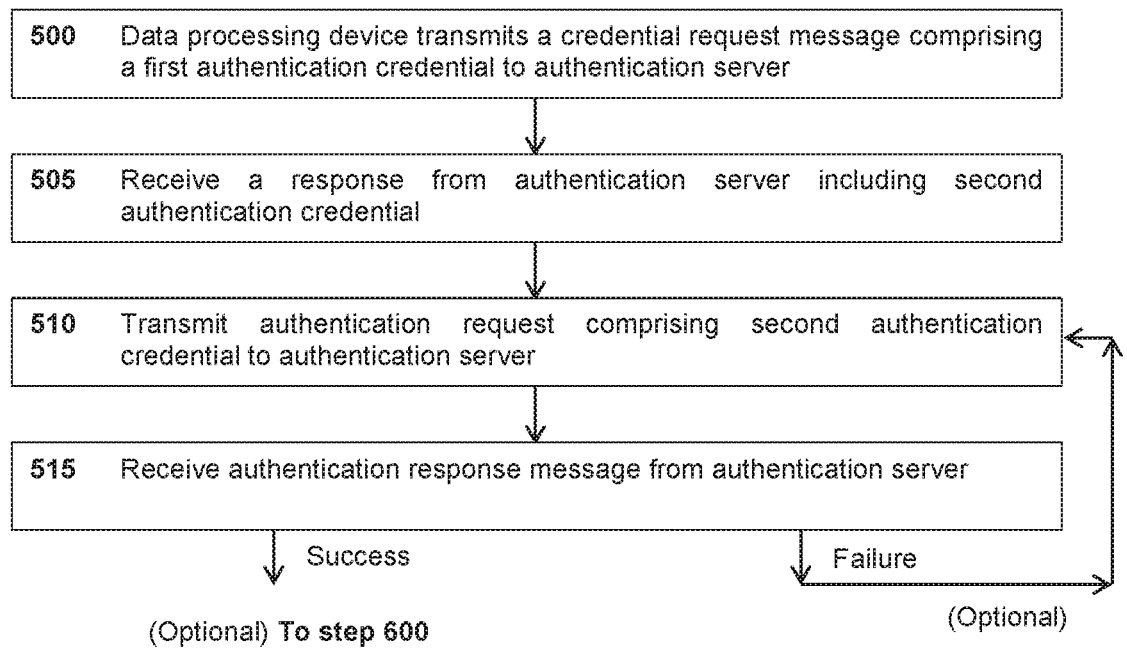
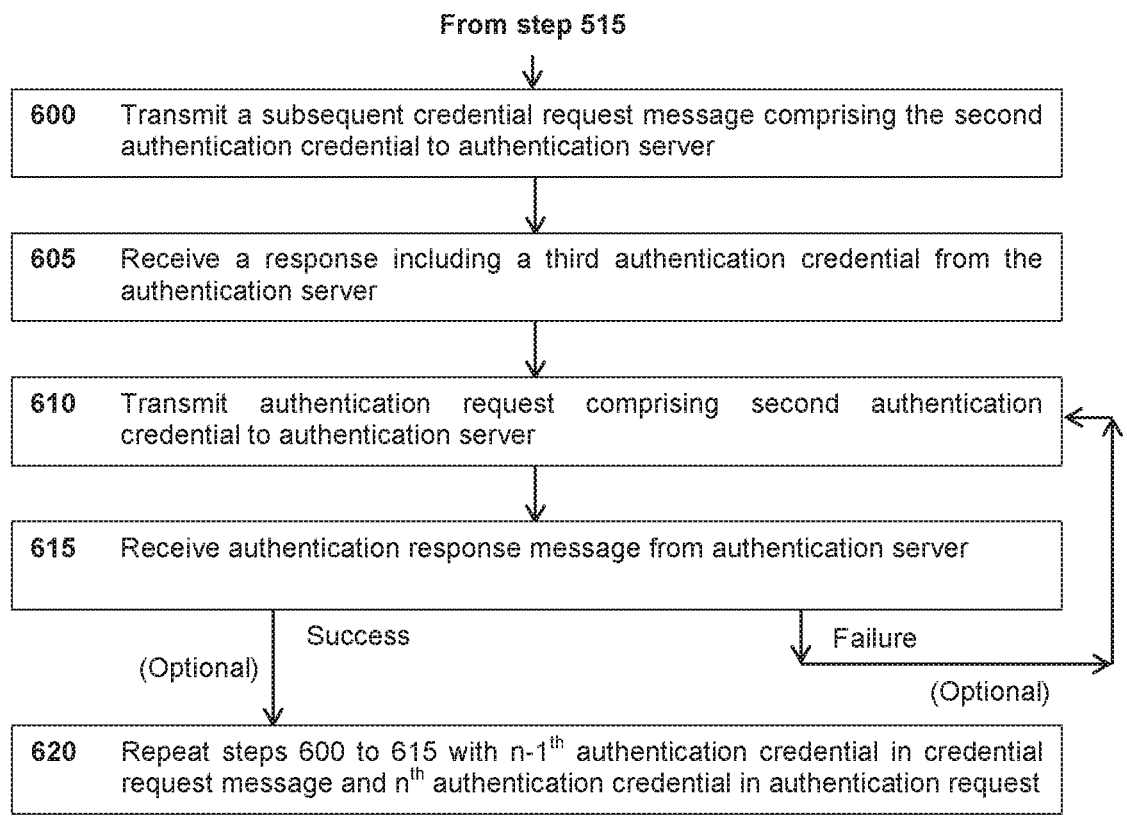

Fig. 10A

| Unique ID | Credential |
|---|---|
| 000001 | 22923daa7b6cce03 |
| 000002 | 7c4103b8355705f7 |

Fig. 10B

| Unique ID | tPAN | Credential | User ID | Timestamp | IP address |
|---|---|---|---|---|---|
| 000001 | 2265864125987431 | 22923daa7b6cce03 | 1701 | 1546337540 | 102.43.24.244 |
| 000002 | 2265864125987431 | 7c4103b8355705f7 | 1701 | 1549017740 | 80.25.69.124 |

Fig. 10C

| Unique ID | tPAN | Credential | User ID | Timestamp | IP address | Credential de-authorised? |
|---|---|---|---|---|---|---|
| 000001 | 2265864125987431 | 22923daa7b6cce03 | 1701 | 1546337540 | 102.43.24.244 | TRUE |
| 000002 | 2265864125987431 | 7c4103b8355705f7 | 1701 | 1549017740 | 80.25.69.124 | TRUE |
| 000003 | 2265864125987431 | 5ac7d39bd91753b0 | 1701 | 1551435860 | 80.25.69.124 | TRUE |
| 000004 | 2265864125987431 | 29f549defeb6962e | 1701 | 1554114260 | 105.201.49.116 | TRUE |
| 000005 |  | b5476ab928215181 | 1701 |  |  | FALSE |

TECHNIQUES FOR REPEAT AUTHENTICATION

CROSS REFERENCE TO RELATED APPLICATIONS

This application claims priority to European Application No. 19197832.9, filed Sep. 17, 2019, which is incorporated herein by reference in its entirety

FIELD OF INVENTION

This invention relates generally to authentication, and more particularly to the processing of authentication requests received in a recurring or repeat manner.

BACKGROUND

In the modern world it is often necessary to provide authentication in an electronic manner, e.g. to use a particular service, communicate with a particular data processing device or to effect an electronic payment. Typically an electronic authentication process involves supplying some form of electronic authentication credential to evidence that the sender of the electronic credential is who they purport to be. The authentication credential itself and/or the process by which it is generated and supplied is designed such that only the authorised party associated with legitimate use of the credential can obtain and use the credential. This enables the identity of the authorised party to be verified. In the context of electronic payments, for example, the authentication credential can be a cryptogram generated according to the EMV® standard as is known in the art.

In some circumstances it is desirable to perform repeat authentication of a particular party; that is, authenticate the same party on multiple, distinct occasions. A nefarious third party can intercept the authentication credential as used in a first or earlier authentication attempt, e.g. in a man-in-the-middle attack between the credential provider and an authentication computer, or by gaining unauthorised access to a database where the credential is stored. Gaining access to the credential enables the third party to subsequently successfully authenticate as though they are the authorised party. This can enable the third party to masquerade as the authorised party, enabling the third party to perform actions detrimental to the authorised party such as commit fraud against the authorised party.

In some cases, provision of the authentication credential may not even be required on the second and subsequent authentication attempts, as instead it may be deemed sufficient to rely upon the fact that authentication was successful on the first attempt. An example of such a circumstance is a recurring or incremental electronic payment, where an electronic payment transaction between two parties occurs on a pre-agreed repeat basis, e.g. a monthly standing order. Typically an authentication credential (e.g. an EMV® cryptogram) needs to be provided only when setting up the repeat payment, i.e. on the first payment, after which subsequent payments will be approved without provision of the authentication credential. A third party obtaining details of the repeat or incremental electronic payment, either through a man-in-the-middle attack over the channel used to set up the payment or by accessing a database in which details of the repeat payment are stored, can then make fraudulent payments, e.g. redirecting subsequent occurrences of the repeat or incremental payment to a bank account under the control of the third party.

There is thus a need for electronic authentication techniques that are particularly suited to circumstances where repeat authentication is required.

SUMMARY OF THE INVENTION

In a first aspect, the invention provides a computer-implemented authentication method, comprising: receiving, by an authentication server from a data processing device performing authentication of a user, a credential request message comprising a first authentication credential; validating, by the authentication server, the first authentication credential; wherein, in the event the validating is successful, the method further comprises: generating, by the authentication server, a second authentication credential; linking, by the authentication server, the second authentication credential to the first authentication credential; transmitting, by the authentication server, the second authentication credential to the data processing device; and de-authorising, by the authentication server, the first authentication credential.

In a second aspect, the invention provides a computer-implemented authentication method, comprising: transmitting, by a data processing device to an authentication server, a credential request message comprising a first authentication credential, the first authentication credential having previously been used to successful authenticate a user with the authentication server; receiving, by the data processing device and responsive to the credential request message, a second authentication credential from the authentication server; transmitting, by the data processing device and to the authentication server, an authentication request to authenticate the user, the authentication request comprising an authentication request message including the second authentication credential; and receiving, by the data processing device and from the authentication server, an authentication response message indicating whether the user has been authenticated successfully on the basis of the second authentication credential.

In a third aspect, the invention provides an authentication server comprising a processor and a memory, the authentication server configured to implement the method of the first aspect.

In a fourth aspect, the invention provides a data processing device comprising a processor and a memory, the data processing device configured to implement the method of the second aspect.

In a fifth aspect, the invention provides a computer-readable storage medium comprising computer-executable instructions stored thereon which, when executed by a processor, cause the processor to perform the method of the first aspect or the second aspect.

BRIEF DESCRIPTION OF THE DRAWINGS

Embodiments of the present invention are described below, by way of example only, with reference to the accompanying drawings, in which:

FIG. 5 is a flow diagram setting out an authentication method performed by a data processing device according to an embodiment;

FIG. 6 is a flow diagram setting out further optional steps of the authentication method of FIG. 5, according to an embodiment;

FIG. 10A shows a first exemplary an electronic record as may be generated by an authentication server in accordance with an embodiment;

FIG. 10B shows a second exemplary an electronic record as may be generated by an authentication server in accordance with an embodiment; and FIG. 10C shows a third exemplary an electronic record as may be generated by an authentication server in accordance with an embodiment.

DETAILED DESCRIPTION OF EMBODIMENTS

In the following description aspects of the invention are at times described in the context of electronic payments. It will be appreciated however that the invention has application in contexts outside of electronic payments, specifically to any environment involving repeat authentication of a user, and thus should not be limited in this regard.

As used herein, the term 'repeat request', 'repeat authentication request', and the like means an authentication request that is part of a chain of authentication requests that are distributed over time. A 'first authentication request' is thus the first request in the chain, which may be thought of as establishing the chain, and a 'subsequent authentication request' is any request occurring after the first authentication request (e.g. a second, third, fourth, $n^{th}$ authentication request, n being an integer greater than 1) and hence forming a link within the chain. Each request in the chain is characterised in that it is associated with a common purpose, e.g. each request effects an electronic payment between the same payor and payee for a given good or service, perhaps as part of a subscription. The time between adjacent authentication requests in the chain may be e.g. hours, days, weeks, months; e.g. a monthly standing order payment.

Generally speaking, the invention provides an authentication method that involves provision of a new authentication credential for each authentication attempt. The requestor of the new authentication credential is required to provide a previous authentication credential in order to successfully receive the new authentication credential. The previous authentication credential has however been de-authorised so it cannot be used to authenticate the requestor, only to successfully obtain a new authentication credential. The requestor then authenticates using the new authentication credential. The cycle is repeated for as many repeat authentication attempts as are made by the requestor.

Figure 1:
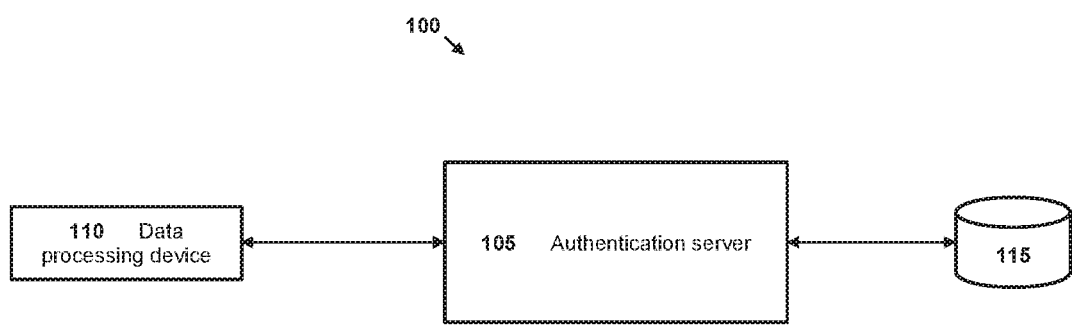
FIG. 1 illustrates in schematic form a system suitable for implementing aspects of the invention.

FIG. 1 shows a block diagram of a system 100 suitable for implementing embodiments of the invention. System 100 includes an authentication server 105 that is communicatively coupled to a data processing device 110, e.g. via a public network such as the internet or a private network or virtual private network. Authentication server 105 is also coupled to a storage medium 115 that is capable of storing electronic records of the type discussed later in this specification.

Authentication server 105 is configured to receive authentication requests from data processing device 110 and to authenticate a user based on the content of the authentication requests. A repeat request arrangement can be established, such that the user requests authentication by authentication server 105 a plurality of times on a respective plurality of distinct occasions. As used herein, a distinct occasion is understood to mean the user requesting authentication again after a successful authentication attempt of said user. A distinct occasion should thus not be considered equivalent to a second authentication attempt following failure of a first authentication attempt; instead, as used herein, this scenario is considered to be a single occasion as authentication was unsuccessful the first time. Typically, the distinct occasions will be separated by a significant amount of time, e.g. hours, days, weeks or months, rather than e.g. seconds, but this the invention is not restricted in this respect.

It will be appreciated that whilst only one data processing device is shown in FIG. 1, it is not necessary for the user to make use of the same data processing device for each authentication attempt. In some cases the user is a legal person, e.g. a service-providing corporation, rather than a natural person; in such cases, data processing device 110 can be a computer operated by the corporation. In the context of a payment network, data processing device 110 is often referred to as a merchant server. The user in such a case can be the corporation themselves, e.g. a merchant providing a good or service. In cases where multiple different data processing devices are to be used to make authentication attempts, the authentication credential needed for the next authentication attempt is preferably stored in a location accessible to all such data processing devices. This may be, for example, a merchant database that is accessible to a plurality of merchant servers.

Authentication server 105 can support concurrent authentication requests from a plurality of different users via respective data processing devices, e.g. tens, hundreds, thousands, etc. The functionality of authentication server 105 may be distributed across a plurality of distinct processors, e.g. in a cloud-based environment of the type known per se in the art.

In one particular embodiment, authentication server 105 is an authorisation server within a payment network and data processing device 110 is a merchant server seeking to effect an electronic payment using the payment network on behalf of a particular customer of the merchant by using payment information of the customer held by the merchant. The payment information may be a primary account number (PAN) or a tokenized representation of a PAN ('tPAN'), as are known in the art per se. In this scenario authentication performed by authentication server 105 can be part of an electronic transaction for transfer of funds, and the authentication messages can be part of this process, e.g. an authorisation request message including the PAN or tPAN and/or authorisation response message. The invention finds particular application in the context of recurring transactions, e.g. recurring or incremental payments, where funds are transferred on behalf of the customer repeatedly on two or more occasions, typically fixed intervals, e.g. weekly, monthly, etc. An example of this includes a monthly standing order payment by a customer for a subscription service provided by a merchant.

Figure 2:
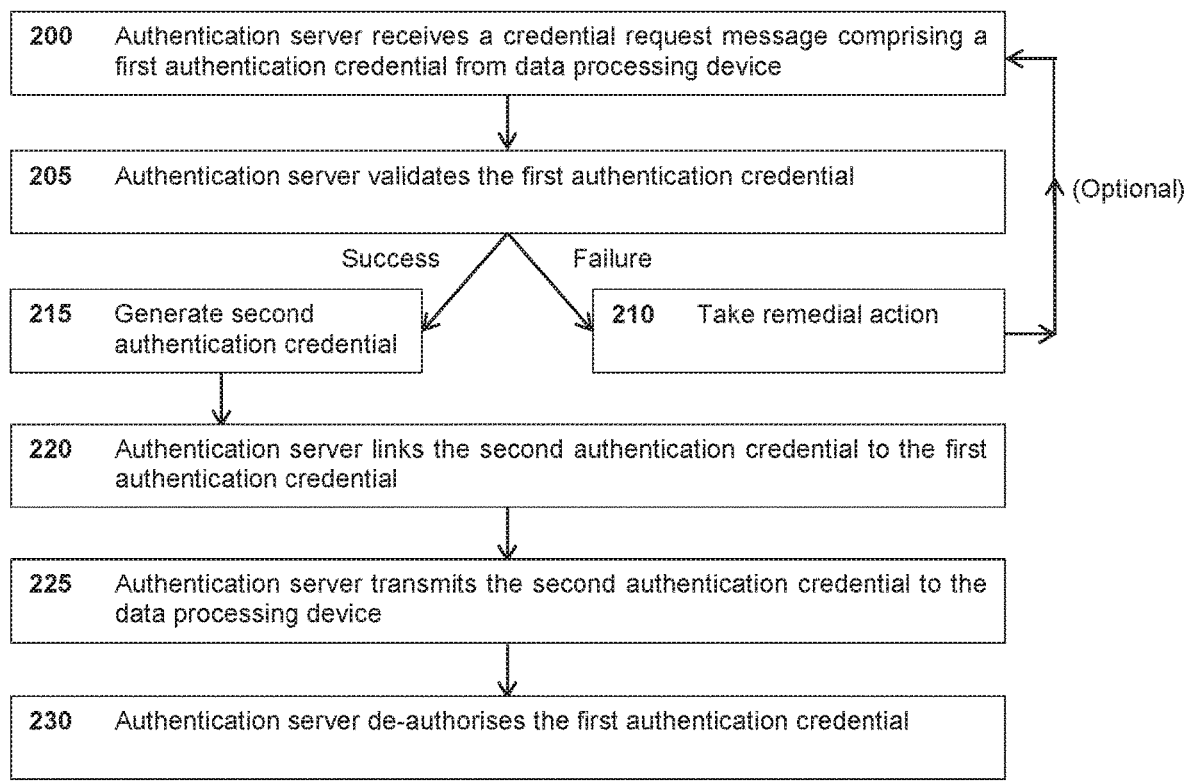
FIG. 2 is a flow diagram setting out an authentication method performed by an authentication server according to an embodiment.

FIG. 2 sets out a method for authentication according to an embodiment. The method of FIG. 2 can be performed by authentication server 105. The method of FIG. 2 takes place on a second occasion following a first occasion on which a user successfully authenticated with authentication server 105.

In step 200, authentication server 105 receives a credential request message comprising a first authentication credential from data processing device 110. The credential request message signals that data processing device 110 requires a new authentication credential in respect of a new authentication attempt for a user, which attempt is being made on a new occasion following a successful authentication attempt of the user using the first authentication credential on a first/previous occasion.

In the context of electronic payments, the first authentication credential can be a cryptogram (e.g. an EMV® cryptogram) of the type known in the art per se, on the basis of which a previous transaction involving the user was approved. The credential request message can further include a unique identifier associated with data processing device 110, which unique identifier enables authentication server 105 to determine the identity of data processing device 110. In the context of a payment network, the unique identifier can be a merchant identifier ('MID') that identifies data processing device 110 as a merchant server operated by a merchant corresponding to the MID. The MID may be assigned to the merchant through an enrolment process with the payment network. Enrolment processes are known in the art per se and so further details of the enrolment process are not provided here.

In step 205, authentication server 105 validates the first authentication credential. Validation comprises any activities necessary to determine whether the first authentication credential is legitimate or not. Validation of the first authentication credential may involve determining, by authentication server 105, whether the first authentication credential has previously been involved in a successful authentication attempt. In the case where the first authentication credential is a cryptogram, e.g. an EMV® cryptogram, validation can include determining whether the first cryptogram has been associated with an approved transaction. Other validation techniques as known in the art per se may be used in addition or in the alternative to the specific validation technique discussed in this paragraph.

In the event that the validation of step 205 fails, authentication server 105 actions step 210 and takes remedial action. The remedial action can include any one or more of: declining the authentication attempt by transmitting an 'authentication declined' message to data processing device 110; transmitting a credential repeat message to data processing device 110, the credential repeat message comprising a request that data processing device 110 provide the first authentication credential again (see path indicated by arrows on FIG. 2 labelled 'optional'); raising an alert, e.g. to a system administrator, that a failed authentication attempt has been made; and/or logging one or more parameters relating to data processing device 110 in a log, the one or more parameters including: an IP address of data processing device 110, a MAC address of data processing device 110, a timestamp corresponding to receipt of the credential request message in step 200, the first authentication credential received in step 200, and/or an identity of the user associated with the first authentication credential. This information may be stored in a log that may be used for forensic analysis in the detection of fraud.

It will be appreciated that, where the remedial action of step 210 returns to step 200 to receive a (further) authentication credential request message, this is not considered to be a separate authentication attempt on a distinct occasion. Rather, this is a continuation of the original authentication attempt on the original occasion.

In the event that the validation of step 205 succeeds, authentication server 105 actions step 215 and generates a second authentication credential. The second authentication credential can be generated using any suitable credential generation technique as are known in the art per se. The second authentication credential can be of the same type as the first authentication credential, e.g. generated according to the same algorithm or process as the first authentication credential, but seeded with different data, or generated randomly. In the case where the first authentication credential is a cryptogram, the second authentication credential is preferably also a cryptogram.

In step 220 authentication server links the second authentication credential to the first authentication credential. Linking can include creating, by the authentication server, an electronic record, e.g. an entry in a database. The electronic record can include the first and second authentication credentials, each stored in association with respective first and second unique identifiers. The unique identifiers are present for the purpose of indexing the electronic record and as such can be any identifier that is suitable for such a purpose, e.g. a value that is incremented by one for each entry in the electronic record. The electronic record is structured such that it is possible to determine that the first and second authentication credentials are related to one another, e.g. by viewing a representation of the electronic record on a computer display or performing a lookup or other such search operation. The electronic record may be part of a data table in a relational database, for example. A schematic form of a suitable electronic record is shown in FIG. 10A.

Additional information can be stored in the electronic record, where such information is chosen according to the specific requirements of the situation at hand. Examples of additional information include any one or more of: a timestamp associated with a time of storage of the authentication credentials on a storage medium, e.g. storage medium 115; a unique user identifier associated with the user seeking authentication (e.g. a MID); a PAN or tPAN associated with the authentication request; a PAN or tPAN expiry date; and/or information relating to data processing device 105 such as an IP address, MAC address, etc. FIG. 10B illustrates a further exemplary form for the electronic record.

In the context of a payment network, the user identifier may be a MID corresponding to a particular merchant. The timestamp can be encoded in any suitable format, e.g. Coordinated Universal Time (UTC) format.

The additional information included in the electronic record may assist with tracking authentication attempts and detection of faults, failures and/or attempts to fraudulently authenticate with authentication server 105. In the case of electronic payments, the additional information included in the electronic record may assist forensic investigations into fraud.

It will be appreciated that part or all of the electronic record can be stored in an encrypted format if desired, to prevent plaintext viewing of data extracted from the record by unauthorised means. It will also be appreciated that a distinct electronic record can be created for each chain of authentication attempts, which in the context of a payment network may be characterised by a common PAN or tPAN (see FIG. 10C). The electronic record can be stored on storage medium 115, e.g. within a database of many such electronic records.

FIG. 100 shows via IP address that a first data processing device was used in a first successful authentication attempt (unique ID 000001), a second data processing device was used in second and third successful authentication attempts (unique IDs 000002 and 000003), and a third data processing device was used in a fourth successful authentication attempt (unique ID 000004). Each attempt used a different credential, all of which have been de-authorised as they have been used successfully. The authentication credential associated with unique ID 000005 has not been de-authorised because it has been issued to the requesting data processing device, but has not yet been used in an authentication attempt.

Returning to FIG. 2, in step 225, authentication server 105 transmits the second authentication credential generated in step 215 to data processing device 110. The second authentication credential can be transmitted in a credential response message.

In step 230, the authentication server de-authorises the first authentication credential. This is understood to mean that the first authentication credential can no longer be used to successfully authenticate the user with authentication server 105. That is, an authentication request received by authentication server 105 comprising the first authentication credential would be denied by the authentication server 105 if such a request was received after the first authentication credential has been de-authorised. In this way the invention provides resistance to a man-in-the-middle type attacks because a third party gaining access to the first authentication credential as part of an authentication request and response exchange will not be able to make use of the first authentication credential to subsequently authenticate with authentication server 105.

The authorised/de-authorised state of each authentication credential may be stored in the electronic record discussed earlier, e.g. as a Boolean value. A timestamp indicating when the de-authorisation occurred may also be stored, if desired.

It will be appreciated that the method of FIG. 2 can be repeated for a subsequent authentication attempt, with the first authentication credential being replaced by the second authentication credential generated in step 225. That is, step 200 is modified such that authentication server receives a credential request message comprising the second authentication credential from a data processing device. The output in this case (assuming successful validation) is a third authentication credential, which is used in an authentication attempt by the user on a third occasion.

It should be apparent that it is not required by the invention that the user make use of the same data processing device on each occasion where authentication is sought. In cases where different data processing devices are used on some or all occasions, it is preferred that each such data processing device has access to a storage medium where the n−1$^{th}$ authentication credential is stored.

The repetition of FIG. 2 can be extended indefinitely by including the n−1th authentication credential in the credential request message of step 200 in order to generate the n$^{th}$ credential for authorisation on the n$^{th}$ occasion, n being an integer greater than or equal to two. FIG. 100 shows an exemplary electronic record after successful authentication attempts on four occasions, with the fifth authentication credential having been generated and transmitted to the requesting data processing device but not yet used in an authentication attempt. The authorisation/de-authorisation state is stored in electronic record, in this example as a Boolean value. No tPAN, timestamp or IP address are present for the fifth authentication credential because the fifth authentication credential has not yet been used in an authentication attempt.

Figure 3:
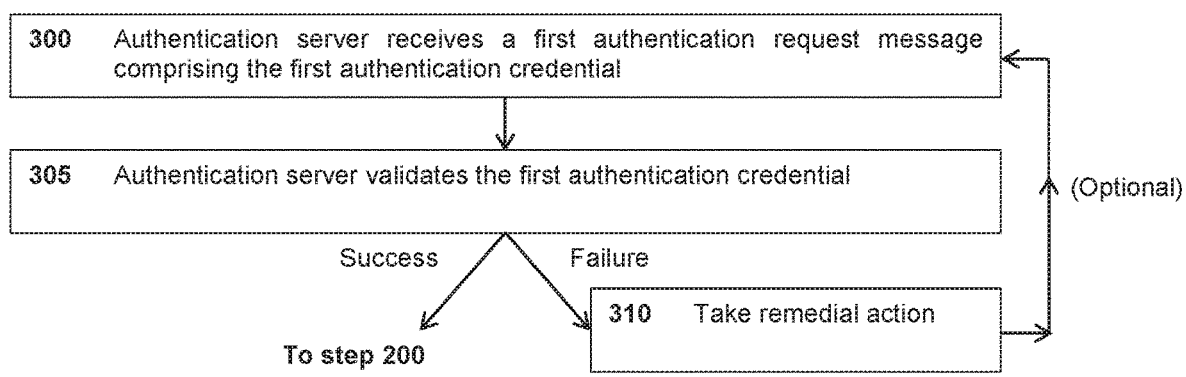
FIG. 3 is a flow diagram setting out further optional steps of the authentication method of FIG. 2, according to an embodiment.

FIG. 3 illustrates additional optional steps of the method of FIG. 2, which steps can be carried out prior to step 200 of FIG. 2. These steps can be part of a first authentication attempt on a first occasion in a chain of authentication attempts occurring on a corresponding plurality of different occasions. In the context of a payment network, this may be a first payment of a recurring or incremental payment.

In step 300, authentication server 105 receives a first authentication request message comprising the first authentication credential also supplied in step 200. The first authentication request message is a request to authenticate a user based on the first authentication credential. The first authentication credential may be provided by data processing device 110. Data processing device 110 may obtain the first authentication credential via a first authentication credential request message transmitted by data processing device 110 to authentication server 105. The first authentication credential request message may include any combination of: a MID, a tPAN, a PAN, a tPAN expiry date and/or a PAN expiry date. If present, the PAN may have been obtained by data processing device 110 from a customer, e.g. as part of payment for provision of goods and/or services by a merchant corresponding to the MID.

In step 305, authentication server 105 validates the first authentication credential. Validation can be performed by any validation technique known in the art, e.g. comparing the first authentication credential to an authentication credential generated by authentication server 105 according to a particular algorithm. If validation is successful, the method moves to step 200 of FIG. 2. If validation is unsuccessful, in step 310 remedial action can be taken by authentication server 105. The remedial action can be any of the actions discussed above in respect of step 210.

Figure 4:
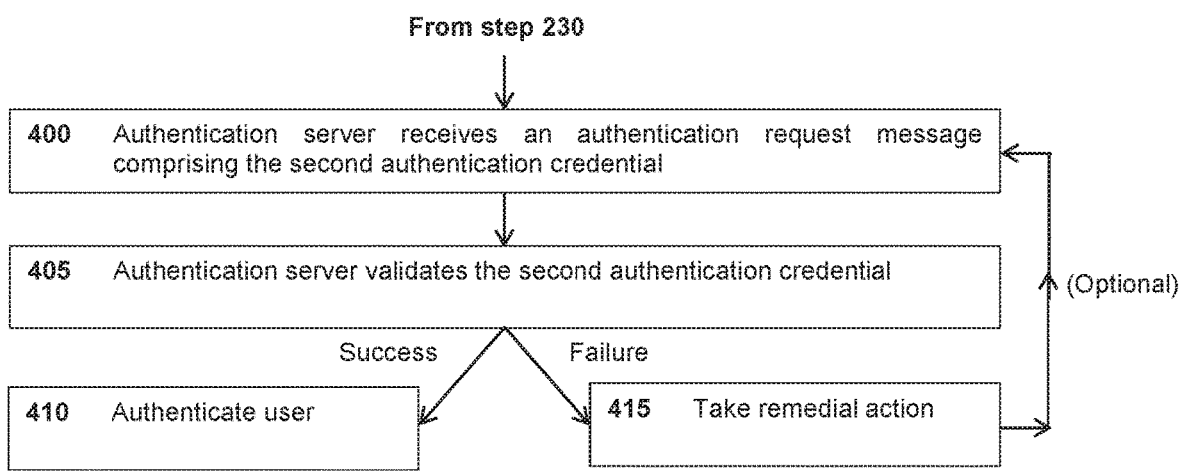
FIG. 4 is a flow diagram setting out further optional steps of the authentication method of FIG. 2, according to an embodiment.

FIG. 4 illustrates additional optional steps of the method of FIG. 2, which steps can be carried out after step 230 of FIG. 2.

In step 400, authentication server 105 receives an authentication request message comprising the second authentication credential that was generated in step 215. The authentication request message may further comprise a flag that indicates that it is a subsequent authentication request associated with a subsequent authentication attempt, i.e. that this is not the first occasion on which the user has attempted to authenticate with authentication server 105. The flag is detectable by authentication server 105, e.g. by parsing a header of the authentication request message.

The authentication request message may additionally or alternatively comprise a unique identifier corresponding to the user that is seeking authentication. In cases where the user is a merchant, the unique identifier may be a MID. The unique identifier may be assigned to the user by authentication server 105 and/or data processing device 110 during an enrolment phase in which the user signs up to make use of the authentication service provided by authentication server 105. The unique identifier typically takes the form of a string of characters, e.g. a string of letters, a string of alphanumeric characters or a string of numeric characters, but is not limited in this regard.

In step 405, authentication server 105 validates the second authentication credential. Validation may include determining, by authentication server 105, whether a link exists between the first and second authentication credentials, e.g. consulting an electronic record of the type discussed in this specification and associated with the second authentication credential to determine whether a first authentication credential is also associated with this record. In the event no such association is found, this may be indicative of the second authentication credential not being associated with a genuine repeat authentication attempt, perhaps indicating a fraudulent attempt to gain authentication.

In the event the authentication is successful, authentication server 105 authenticates the user (step 410). In the event the authentication fails, in step 415 authentication server 105 takes remedial action of the type described above in respect of step 210.

In the context of electronic payments, step 410 can include authentication server 105 contacting an issuer server and indicating that it has authorised a particular payment transaction. The issuer server can then decide whether it to wishes to authorise the payment transaction and communicate the result to the user, which in this context is a merchant server.

It will be appreciated that the combination of FIGS. 2, 3 and 4 describes a process under which a user can use an authentication credential from a first authentication attempt (FIG. 3) to receive a second authentication credential (FIG. 2), which second authentication credential enables the user to authenticate on a second, different occasion (FIG. 4). This process is resistant to man-in-the-middle attacks, as each authentication credential can only be used to authenticate a user once. This means that an authentication credential obtained by an unauthorised third party cannot be used by said third party to fraudulently authenticate in place of the authorised user.

As touched upon earlier in this disclosure, in existing payment networks recurring or incremental payment transactions require an authentication credential (e.g. a cryptogram) to be provided only in the first instance of the transaction. Future transactions of the recurring or incremental payment are authorised on the basis of a PAN/tPAN and PAN expiry date/tPAN expiry date being provided; no authentication credential such as a cryptogram is required. It will be appreciated that the present invention provides significant improvements in security over such existing payment networks, where gaining access to a PAN/tPAN and corresponding expiry date (e.g. via a man-in-the-middle attack) can enable fraudulent payments to be made.

FIG. 5 sets out a further method for authentication according to an embodiment. The method of FIG. 5 can be performed by data processing device 110. The method of FIG. 5 complements the method of FIG. 2 in the sense that it describes the actions performed by data processing device 110 in its interactions with authentication device 105.

In step 500, data processing device 110 transmits a credential request message comprising a first authentication credential to authentication server 105. The credential request message is transmitted to enable a user to authenticate with authentication server 105. The first authentication credential may have already been used by the user to authenticate with authentication server 105 on a previous occasion.

In step 505, data processing device 110 receives a response to the credential request message transmitted in step 500, the response including a second authentication credential. Data processing device 110 can store the second authentication credential in a memory that it has access to, preferably a non-volatile memory.

In step 510, data processing device 110 transmits an authentication request to authenticate the user, the authentication request comprising an authentication request message including the second authentication credential. This is understood to be a second or later request for authentication by the user, with a first successful authentication attempt having taken place on a prior, distinct occasion. It will be apparent that a significant amount of time may pass between steps 505 and 510, e.g. hours, days, weeks, months, etc. In the case of recurring or incremental electronic payments, the time between steps 505 and 510 is typically equal to the time between adjacent electronic payments within a recurring or incremental payment arrangement.

In step 515, data processing device 110 receives an authentication response message from authentication server 105. The authentication response message indicates whether the user has been authenticated successfully on the basis of the second authentication credential. In the event the user is successfully authenticated, the method can optionally include the further steps described in connection with FIG. 6. This continuation of the method may occur, for example, in the circumstance where the occasion on which the user was authenticated using the second authentication credential is not the final occasion on which the user requires authentication. For example, this could be where the user has made an intermediate electronic payment in a series of recurring or incremental payments, and hence needs to make at least one further electronic payment at a later time.

In the event authentication of the user based on the second authentication credential fails, the method may optionally return to step 510 and data processing device 110 may re-transmit the second authentication credential to authentication server 105. As part of the re-transmission, data processing device 110 may examine the second authentication credential to determine whether it has been corrupted, e.g. by computing a checksum of the second authentication credential and determining whether the checksum is correct. The options available to data processing device 110 following an authentication failure may be defined by a security policy held by authentication server 105. For example, data processing device 110 may be allowed a finite number of failed authentication attempts before termination of the authentication process by authentication server 105.

FIG. 6 shows optional further steps of the authentication method of FIG. 5, which steps may be carried out in the event that the user is successfully authenticated in step 515. The optional further steps of FIG. 6 may be carried out where the occasion on which the user was authenticated using the second authentication credential is not the final occasion on which the user requires authentication.

In step 600, data processing device 110 transmits a subsequent credential request message comprising the second authentication credential to authentication server 105.

In step 605, data processing device 110 receives a third authentication credential from the authentication server. Data processing device 110 can store the third authentication credential in a memory that it has access to, preferably a non-volatile memory.

In step 610, data processing device 110 transmits an authentication request to authenticate the user, the authentication request comprising an authentication request message including the third authentication credential. Other than the fact that the third authentication credential is included in the message instead of the second authentication credential, step 610 is the same as step 510 described earlier.

In step 615, data processing device 110 receives an authentication response message from authentication server 105. Other than the fact this authentication response message is based on the third authentication credential instead of the second authentication credential, step 615 is the same as step 515 described earlier.

In the event the authentication response message indicates that authentication was successful, in step 620 the process of steps 600 to 615 FIG. 6 can optionally be repeated. In each repetition of this process, the authentication credential upon which authentication was successfully performed is included in a credential request message to obtain a new authentication credential for the next authentication attempt. In general therefore, the n−1$^{th}$ authentication credential is included in a credential request message to obtain the n$^{th}$ authentication credential for authorisation on the n$^{th}$ occasion, n being an integer greater than or equal to two.

Figure 7:
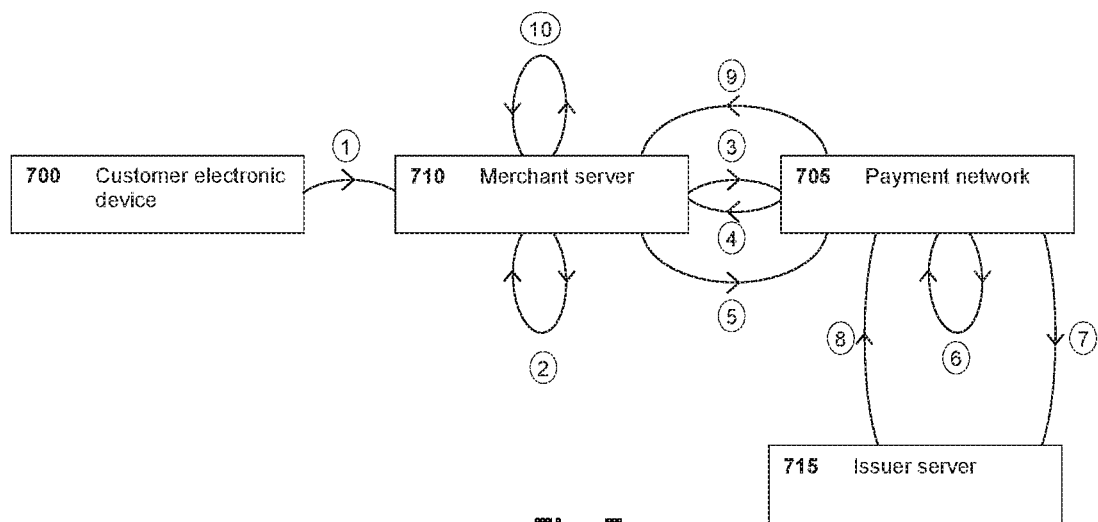
FIG. 7 shows in schematic form a data processing device that is suitable for performing the functions of the data processing device or the authentication server within the system shown in FIG. 1.

FIG. 7 shows an implementation of the invention in the context of a customer establishing a recurring or incremental electronic payment, according to an embodiment.

The system of FIG. 7 includes a customer electronic device 700, which device is usable by a customer to arrange a recurring or incremental electronic payment for goods and/or services provided by a merchant operating merchant server 710. Customer electronic device can be e.g. a mobile phone, laptop, desktop computer, tablet computer, games console, smart TV, and the like. Merchant server 710 is equivalent to data processing device 110 as described above.

The customer arranges for payment of the goods and/or services using a payment card. This can be a physical payment card or a virtual payment card provisioned on customer electronic device 700 and stored in a digital wallet, as is known per se in the art.

The electronic payment is split up into at least two individual transactions, each transaction occurring on a different occasion. Each transaction is processed by payment network 705. Payment network 705 incorporates the functionality of authentication server 105 as described above.

The system of FIG. 7 further includes an issuer server 715 that is operated by an issuer of the customer's payment card that is being used to effect payment. The issuer is thus typically a bank at which the customer has a bank account to which the payment card corresponds.

Customer electronic device 700 is communicatively coupled to merchant server 710 via a public network such as the internet, a private network or virtual private network. Merchant server 710 is communicatively coupled to payment network 705 via another network, typically a private network or virtual private network, but possibly a public network such as the internet. Payment network 705 is communicatively coupled to payment network 715 via a further network, again typically a private network or virtual private network, but possibly a public network such as the internet.

FIG. 7 includes a series of steps labelled 1 to 10, and the operations performed in each of these steps are described below. These steps are performed in ascending numerical order to provide operations that enable a first payment in a series of recurring or incremental payments to be set up.

Step 1: Customer associates their payment card with an account administered by a merchant. Card details are provided to merchant server 710 by customer electronic device 700 as part of this process.

Step 2: Merchant server 710 tokenises the card details by generating a token based on a PAN of the card, as is known in the art per se. Merchant server 710 stores the token (e.g. a tPAN) in a non-volatile storage medium accessible by merchant server 710.

Step 3: Merchant server 710 starts the process of taking a first payment by transmitting a credential request message to payment network 705, the credential request message requesting an EMV® cryptogram or equivalent.

Step 4: Payment network 705 responds to the credential request message by providing a first payment credential to merchant server 710, the first payment credential taking the form of a first EMV® cryptogram or equivalent.

Step 5: Merchant server 710 transmits a transaction authorisation request message to payment network 705, the transaction authorisation request message including the token generated in step 2, an expiry date of the token and the cryptogram received in step 4. The transaction authorisation request message is an example of an authentication request message as described above.

Step 6: Payment network 705 validates the cryptogram and the token and, if validation is successful, detokenises the token to obtain a PAN. Techniques for performing detokenization are known in the art per se.

Step 7: Payment network 705 transmits the PAN obtained in step 6 to issuer server 715 in an authorisation request message, requesting final approval of the transaction.

Step 8: Issuer server 715 transmits an authorisation response message to payment network 705, indicating whether the issuer has approved or declined the transaction.

Step 9: Payment network 705 forwards the authorisation response message to merchant server 710. Assuming the transaction was approved by the issuer, payment network 705 also de-authorises the first cryptogram.

Step 10: In the event of approval of the transaction, merchant server 710 stores the first cryptogram in a non-volatile storage medium accessible by merchant server 710.

Figure 8:
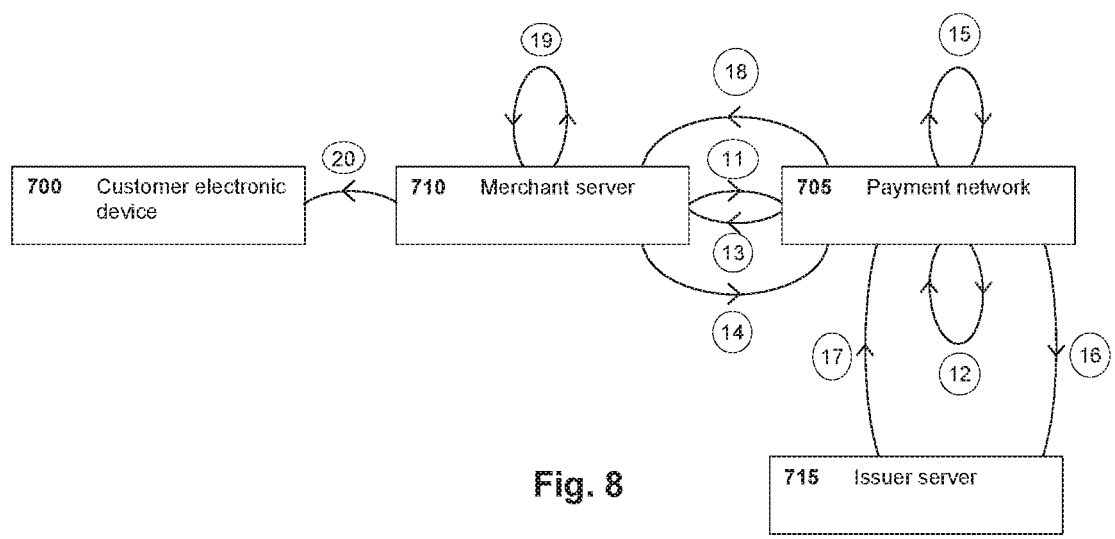
FIG. 8 shows in schematic form operation of a system that is suitable for implementing the invention in the context of a recurring or incremental electronic payment, according to an embodiment.

FIG. 8 illustrates the system of FIG. 7 operating in accordance with a subsequent payment of the series of recurring or incremental payments. It will be appreciated that steps 11 to 20 can be repeated as many times as are necessary to effect all payments in the series of recurring or incremental payments.

Step 11: Merchant server 710 transmits a credential request message including the first cryptogram to payment network 705.

Step 12: Responsive to the credential request message, payment network 705 validates the first cryptogram and, if validation is successful, generates a second cryptogram and links the second cryptogram to the first cryptogram, e.g. by creating an electronic record, or appending to an existing electronic record, the electronic record of the type described above. Validation of the first cryptogram can include checking, by payment network 705, whether an authorised transaction has been performed previously using the first cryptogram. In the affirmative, the first cryptogram may be validated. In the negative, the first cryptogram may not be validated.

Step 13: Assuming validation in step 12 is successful, payment network 705 transmits the second cryptogram to merchant server 710.

Step 14: Merchant server 710 transmits a transaction authorisation request message to payment network 705, the transaction authorisation request message including the token generated in step 2 (FIG. 7), an expiry date of the token, the second cryptogram received in step 13 and a flag indicating that the transaction is part of a recurring or incremental payment. The transaction authorisation request message is an example of an authentication request message as described above.

Step 15: Payment network 705 detects the flag and processes the transaction authorisation request as a recurring or incremental request. Payment network 705 validates the second cryptogram and the token and, if validation is successful, detokenizes the token to obtain a PAN. Detokenization techniques are known in the art per se. The validation of the second cryptogram can include determining, by payment network 705, whether an electronic record of the type discussed above (see also FIGS. 10A-10C) associated with the second cryptogram also includes reference to a first cryptogram. In the absence of a reference to the first cryptogram in the record, payment network 705 can determine that the second cryptogram is not related to a genuine recurring or incremental payment and may therefore be indicative of an attempt to commit fraud.

Step 16: Payment network 705 transmits the PAN obtained in step 15 to issuer server 715 in an authorisation request message, requesting final approval of the transaction.

Step 17: Issuer server 715 transmits an authorisation response message to payment network 705 indicating whether the issuer approved or declined the transaction.

Step 18: Payment network 705 forwards the authorisation response message to merchant server 710. Assuming the transaction was approved, payment network 705 also de-authorises the second cryptogram.

Step 19: Assuming the transaction was approved, merchant server 710 stores the second cryptogram in a non-volatile storage medium accessible by merchant server 710.

Step 20: Optionally, the approval or disapproval of the transaction may be reported to customer electronic device 700 by merchant server 710, e.g. via an email, SMS message, and the like.

Figure 9:
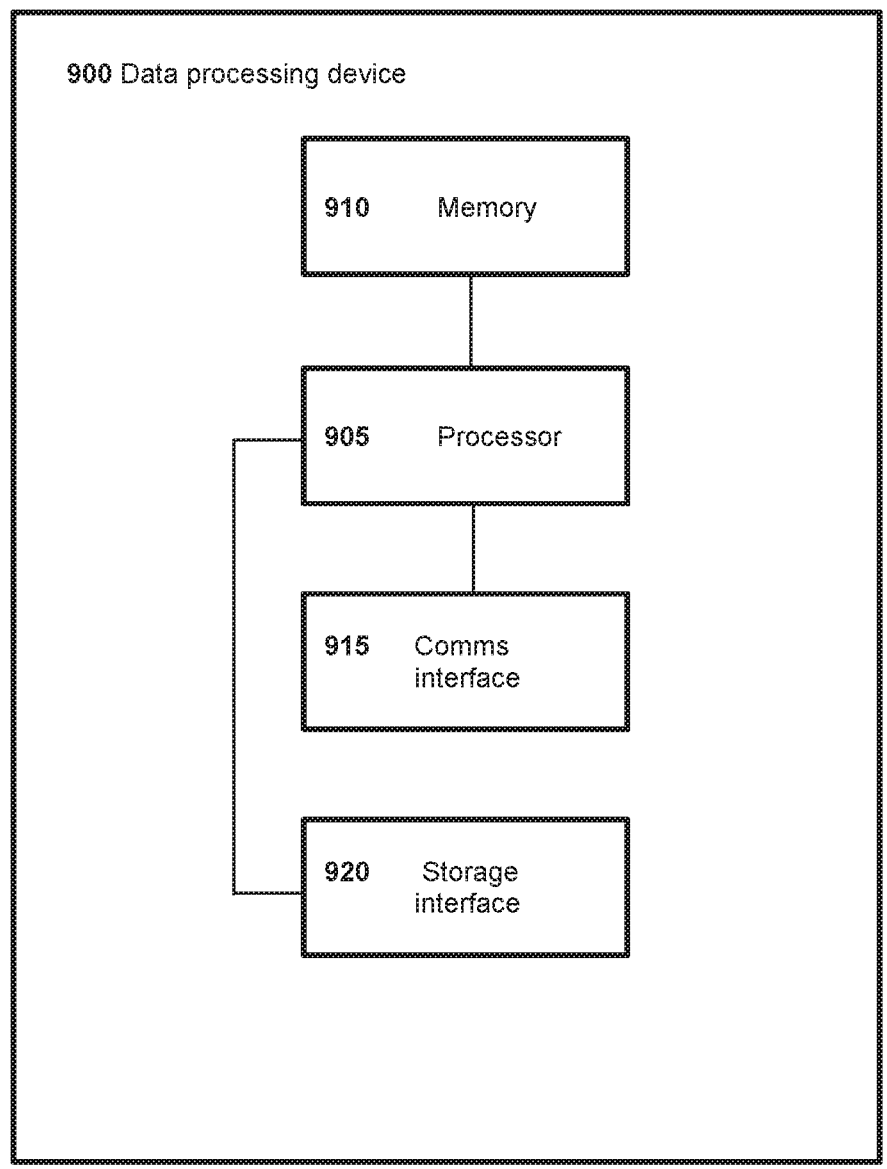
FIG. 9 shows in schematic form further operation of the system of FIG. 8.

It will be apparent to a person skilled in the art that the methods described herein are all suitable for implementation by a data processing device. By way of example, FIG. 9 shows in schematic form a data processing device 900 that is suitable for performing the functions of authentication server 105, data processing device 110, customer electronic device 700, payment network 705, merchant server 710 or issuer server 715.

Data processing device 900 includes a processor 905 for executing instructions. Instructions may be stored in a memory 910, for example. Processor 905 may include one or more processing units (e.g., in a multi-core configuration) for executing instructions. The instructions may be executed within a variety of different operating systems on the data processing device 900, such as UNIX, LINUX, Microsoft Windows®, etc. More specifically, the instructions may cause various data manipulations on data stored in memory 910 (e.g., create, read, update, and delete procedures). It should also be appreciated that upon initiation of a computer-implemented method, various instructions may be executed during initialization. Some operations may be required in order to perform one or more methods described herein, while other operations may be more general and/or specific to a particular programming language (e.g., C, C#, C++, Java, or other suitable programming languages, etc.).

Processor 905 is operatively coupled to a communication interface 915 such that data processing device 900 is capable of communicating with a remote device, such as another data processing device of system 100 or the system of FIG. 7 or 8.

Processor 905 may also be operatively coupled to a storage device such as storage medium 115 via storage interface 920. The storage device is any computer-operated hardware suitable for storing and/or retrieving data. In some cases, e.g. a remotely located storage medium, communication interface 915 may perform the function of storage interface 920 such that these two entities are combined.

The storage medium can be integrated in data processing device 900, or it can be external to data processing device 900 and located remotely. For example, data processing device 900 may include one or more hard disk drives as a storage device. Alternatively, where the storage device is external to data processing device 900, it can comprise multiple storage units such as hard disks or solid state disks in a redundant array of inexpensive disks (RAID) configuration. The storage device may include a storage area network (SAN) and/or a network attached storage (NAS) system.

Processor 905 can be operatively coupled to the storage device via a storage interface 920. Storage interface 920 is any component capable of providing processor 905 with access to the storage device. Storage interface 920 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 905 with access to the storage device.

Memory 910 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is enabling sensitive data such a cryptogram to be distributed among secondary merchant data processing devices in a secure manner. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

The invention claimed is:

1. A computer-implemented authentication method, comprising:
    receiving, by an authentication server from a data processing device performing authentication of a user, a credential request message comprising a first authentication credential, the credential request message including a request for a second authentication credential, the first authentication credential having been previously used to authenticate the user;
    validating, by the authentication server, the first authentication credential;
    after successfully validating the first authentication credential, generating, by the authentication server, the second authentication credential;
    linking, in a database by the authentication server, the second authentication credential to the first authentication credential;
    transmitting, by the authentication server, the second authentication credential to the data processing device; and
    de-authorising, by the authentication server, the first authentication credential.

2. The computer-implemented method of claim 1, further comprising, before the receiving:
    receiving, by the authentication server as part of a first authentication attempt by the user, a first authentication request message comprising the first authentication credential; and
    validating, by the authentication server, the first authentication credential.

3. The computer-implemented method of claim 2, further comprising:
    receiving, by the authentication server as part of a subsequent authentication attempt by the user, a subsequent authentication request message comprising the second authentication credential; and
    validating, by the authentication server, the second authentication credential.

4. The computer-implemented method of claim 3, wherein the subsequent authentication request message further comprises a flag indicating that the authentication attempt is a subsequent authentication attempt.

5. The computer-implemented method of claim 3 wherein, in the event the validating of the second authentication credential is successful, the method further comprises:
    generating, by the authentication server, a third authentication credential;
    linking, by the authentication server, the third authentication credential to the second authentication credential;
    transmitting, by the authentication server, the third authentication credential to the data processing device; and
    after the transmitting, de-authorising, by the authentication server, the second authentication credential.

6. The computer-implemented method of claim 4 wherein, in the event the validating of the second authentication credential is successful, the method further comprises:
    generating, by the authentication server, a third authentication credential;
    linking, by the authentication server, the third authentication credential to the second authentication credential;
    transmitting, by the authentication server, the third authentication credential to the data processing device; and
    after the transmitting, de-authorising, by the authentication server, the second authentication credential.

7. The computer-implemented method of claim 1, wherein linking, by the authentication server, the second authentication credential to the first authentication credential comprises:
    creating, by the authentication server, an electronic record comprising:
        a first unique identifier associated with the first authentication credential;
        a second unique identifier associated with the second authentication credential;
        the first authentication credential;
        the second authentication credential;
    the linking further comprising storing the first unique identifier in association with the first authentication credential in the electronic record and storing the second unique identifier in association with the second authentication credential in the electronic record.

8. The computer-implemented method of claim 5, wherein linking, by the authentication server, the second authentication credential to the first authentication credential comprises:
    creating, by the authentication server, an electronic record comprising:
        a first unique identifier associated with the first authentication credential;
        a second unique identifier associated with the second authentication credential;
        the first authentication credential;
        the second authentication credential;
    the linking further comprising storing the first unique identifier in association with the first authentication credential in the electronic record and storing the second unique identifier in association with the second authentication credential in the electronic record.

9. The computer-implemented method of claim 6, wherein linking, by the authentication server, the second authentication credential to the first authentication credential comprises:
    creating, by the authentication server, an electronic record comprising:
        a first unique identifier associated with the first authentication credential;
        a second unique identifier associated with the second authentication credential;
        the first authentication credential;

the second authentication credential;

the linking further comprising storing the first unique identifier in association with the first authentication credential in the electronic record and storing the second unique identifier in association with the second authentication credential in the electronic record.

10. The computer-implemented method of claim 5, wherein linking, by the authentication server, the second authentication credential to the first authentication credential comprises:

creating, by the authentication server, an electronic record comprising:
  a first unique identifier associated with the first authentication credential;
  a second unique identifier associated with the second authentication credential;
  the first authentication credential;
  the second authentication credential;
the linking further comprising storing the first unique identifier in association with the first authentication credential in the electronic record and storing the second unique identifier in association with the second authentication credential in the electronic record;
and wherein linking, by the authentication server, the third authentication credential to the second authentication credential, further comprises:
  generating, by the authentication server, a third unique identifier associated with the third authentication credential;
  storing, by the authentication server and in the electronic record, the third unique identifier in association with the third authentication credential.

11. The computer-implemented method of claim 7, wherein each entry in the electronic record further comprises one or more of:
  a timestamp indicating a time at which the respective authentication credential was stored in the electronic record; and
  a unique identifier associated with the user.

12. The computer-implemented method of claim 10, wherein each entry in the electronic record further comprises one or more of:
  a timestamp indicating a time at which the respective authentication credential was stored in the electronic record; and
  a unique identifier associated with the user.

13. The computer-implemented method of claim 1, wherein the authentication server is a component of a payment network, the user is a merchant, the data processing device is a merchant server, and wherein the authentication method is performed as part of a recurring or incremental series of transaction effected via the payment network.

14. The computer-implemented method of claim 13, wherein the first authentication credential is a first cryptogram and the second authentication credential is a second cryptogram.

15. The computer-implemented method of claim 5, wherein the authentication server is a component of a payment network, the user is a merchant, the data processing device is a merchant server, and wherein the authentication method is performed as part of a recurring or incremental series of transaction effected via the payment network.

16. The computer-implemented method of claim 6, wherein the authentication server is a component of a payment network, the user is a merchant, the data processing device is a merchant server, and wherein the authentication method is performed as part of a recurring or incremental series of transaction effected via the payment network.

17. The computer-implemented method of claim 7, wherein the authentication server is a component of a payment network, the user is a merchant, the data processing device is a merchant server, and wherein the authentication method is performed as part of a recurring or incremental series of transaction effected via the payment network.

18. A computer-implemented authentication method, comprising:

transmitting, by a data processing device to an authentication server, a credential request message comprising a first authentication credential, the credential request message including a request for a second authentication credential, the first authentication credential having previously been used to successfully authenticate a user with the authentication server;

receiving, by the data processing device and responsive to the credential request message, a second authentication credential from the authentication server;

transmitting, by the data processing device and to the authentication server, an authentication request message, the authentication request message including the second authentication credential; and receiving, by the data processing device and from the authentication server, an authentication response message indicating whether the user has been authenticated successfully on the basis of the second authentication credential.

19. The computer-implemented authentication method of claim 18 wherein, in the event the user is successfully authenticated on the basis of the second authentication credential, the method further comprises:

transmitting, by the data processing device to the authentication server, a subsequent credential request message comprising the second authentication credential, the subsequent credential request message including a request for a third authentication credential;

receiving, by the data processing device and responsive to the subsequent credential request message, the third authentication credential from the authentication server; and transmitting, by the data processing device and to the authentication server, a subsequent authentication request message to authenticate the user, the subsequent authentication request message comprising the third authentication credential.

20. An authentication server comprising:

a database having an electronic record stored thereon;

a processor; and a memory, the memory including computer-executable instructions stored thereon that, when executed by a processor, cause the processor to:

receive, from a data processing device performing authentication of a user, a credential request message comprising a first authentication credential, the credential request message including a request for a second authentication credential, the first authentication credential having been previously used to authenticate the user;

validate, by the authentication server, the first authentication credential;

after successfully validating the first authentication credential, generate the second authentication credential;

link, in the electronic record stored on the database, the second authentication credential to the first authentication credential;
transmit the second authentication credential to the data processing device; and
de-authorise the first authentication credential.

\* \* \* \* \*